July 26, 1966  N. J. WAECKER ETAL  3,262,265
COMBINED ROCKET AND CATAPULT MOTORS
Filed June 3, 1964

INVENTORS.
NORMAN J. WAECKER
ALBERT BENDITT
BY: Harry M. Saragovitz,
Edward J. Kelly,
Herbert Berl &
S. Duhoff   ATTORNEYS.

United States Patent Office 3,262,265
Patented July 26, 1966

3,262,265
COMBINED ROCKET AND CATAPULT MOTORS
Norman J. Waecker, Masonville, N.J., and Albert Benditt, Philadelphia, Pa., assignors to the United States of America as represented by the Secretary of the Army
Filed June 3, 1964, Ser. No. 372,439
3 Claims. (Cl. 60—35.6)

The invention described herein may be manufactured and used by or for the Government for governmental purposes without the payment to us of any royalty thereon.

This invention relates to combined rocket and catapult motors and has for an object to enhance the safety of personnel ejected by a catapult and rocket from an aircraft and especially to reduce the danger of a misfire which would prevent the proper functioning of either or both the catapult and rocket motors.

In related constructions a catapult motor controls the initial ejection of a seat and occupant from an areoplane and a rocket motor takes over the lifting function after the catapult motor has completed its function, the rocket motor doing so with a smooth transition and without noticeable deceleration.

With experience in probabilities of misfires in primers of numerous types in various weapons, the Air Force has desired to minimize the danger of a misfire in not ejecting a seat and occupant. To this end the present invention has vastly decreased the probability of misfire occurring in either the catapult motor or the rocket motor, or the cartridge or booster for firing each motor. More specifically, it has been discovered that the initiator for actuating a firing pin in the catapult motor, through no part of that motor and located about 6 feet therefrom, has a useful life of as much as about 200 milliseconds, much longer than the useful life of the propellant in the first motor to be fired, i.e., the catapult motor. It has also been discovered that the temperature and pressure developed by this initiator, at the time the catapult motor normally fires the rocket motor, is well above the residual temperature and pressure of the catapult motor gas near the end of its stroke. Such residual temperature and pressure is often of such a reduced nature that it often is insufficient to ignite the secondary igniter for the rocket propellant, resulting in misfires mentioned hereinabove.

It is a primary object of the invention to provide an arrangement whereby the unexpended energy of the catapult initiator is employed to increase the residual catapult gas temperature and pressure to assure certain ignition of the secondary igniter.

A further object of the invention is to provide the arrangement with an improved means for assuring ignition of the catapult propellant in the initial stage of operation.

Referring to the drawings.

Figure 1:
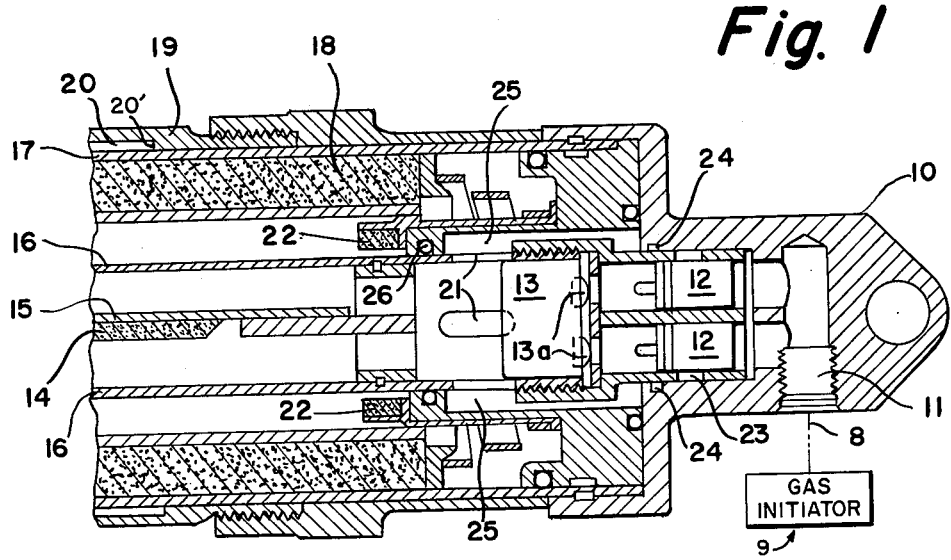
FIG. 1 is a longitudinal section through a rear end portion of the concentric catapult and rocket motor according to this invention.
Figure 2:
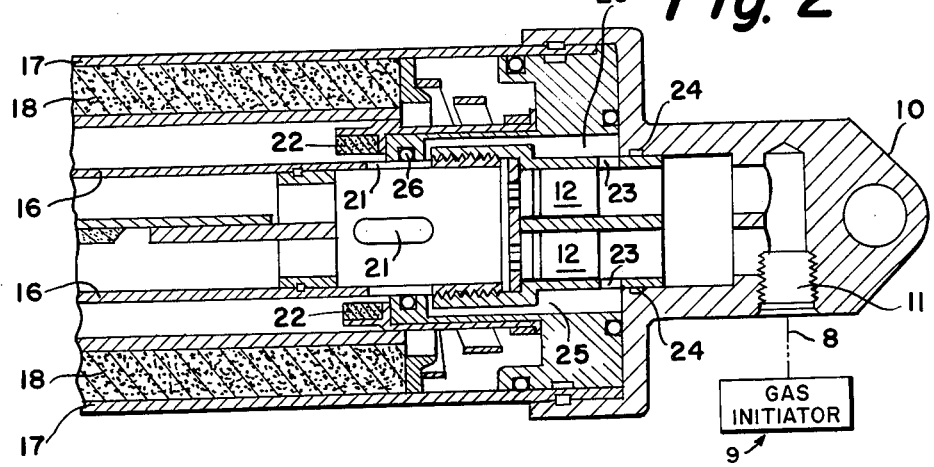
FIG. 2 is a view corresponding to FIG. 1 but with catapult motor valves open for mixing initiator gas with that of the catapult motor for firing the rocket motor.

An initiator 9, fired in the customary manner either electrically or by percussion, supplies gas through the usual hose line 8 to the opening 11 in the head end fitting 10 to which the ejection seat (not shown) is attached. The supplied pressure moves the two separate firing pins 12, 12 for firing explosive in cartridge 13 having two separate percussion primers 13a, 13a. Flame from cartridge 13 shoots rearward or to the left igniting the propellant 14 for the catapult creating a pressure differential to start the seat ejection operation as is well known in the art. Propellant 14 is shown as being carried by its support 15 within the catapult motor tube 16. Enclosing tube 16 and concentric therewith is the rocket motor tube 17 containing the rocket motor propellant 18. The outer or launching tube 19, slidably receiving rocket tube 17, contains a portion having an annular recess 20 therein, in which during the last approximately 5 inches of catapult movement relative to the launching tube 19, a catapult unlatching detent (not shown) is received and quickly sheared off by recess edge 20'. Subsequent unitary movement of the tubes of the catapult (or booster tube) and rocket approach separation of the unit from the launching tube 19. After the catapult tube has been released or unlatched and moved rearwardly a predetermined short distance, the gas of initiator 9, capable of sustaining a relatively higher temperature and pressure than the residual catapult propellant gas at this time, is mixed with the residual catapult propellant gas to assure ignition of secondary igniter 22 which in turn ignites the rocket motor propellant 18. The gas initiator 9 also functions to assist in moving catapult tube 16 rearwardly to the position shown in FIG. 2 wherein openings 23 in booster tube 16 (which functions as a slide valve) are now in a position rearward of O-ring 24, enabling the high temperature and high pressure gas from initiator 9 to enter chamber 25. Similarly, openings 21 of tube 16 are now in a position straddling or spanning the O-ring 26, enabling the relatively higher pressure initiator gas from chamber 25 to enter booster tube 16 and be mixed with the residual lower temperature gas from the catapult propellant. The augmented mixture of gases leave tube 16 through openings 21 rearwardly of O-ring 26 and cooperatively ignite secondary booster igniter 22. From the aforementioned, it can be seen that gas from catapult propellant or booster tube 16 has its effectiveness substantially increased to minimize the possibility of misfire.

The initiator gas from passage 11 is used to fire multiple firing pins 12, 12, each of which fires respective percussion primers embedded in the cartridge 13. Thus, this arrangement enhances the ignition of the catapult propellant 14. The igniter 9 preferably includes 2.8 grams of an explosive having approximately the following composition in parts by weight: nitrocellulose, 75.50; nitroglycerin, 20.00; barium nitrate, 1.50; potassium nitrate, 1.00; graphite, 0.75; diphenylamine, 0.25; and dinitrotoluene, 1.00.

Certain modifications, alterations or changes may be resorted to without departing from the scope of the invention as defined in the appended claims.

We claim:

1. A combined catapult and rocket motor for use in aircraft ejection seat apparatus comprising a propellant actuated catapult motor for initiating seat ejection, a rocket type propellant actuated motor radially outside and slidably receiving said catapult motor, said rocket motor being actuated in response to a predetermined relative longitudinal travel of said catapult motor, a first initiator adjacent said catapult motor, firing pin means responsive to gas from said first initiator for igniting propellant of said catapult motor to develop a pressure differential for moving said catapult motor, a secondary igniter adjacent said rocket motor, and means uncovered by movement of said catapult motor for communicatively connecting unexpended gas from said first initiator and residual gas from said catapult motor with said secondary igniter, so constructed and arranged that said first initiator and secondary igniter will respectively ignite said catapult and rocket motors in a manner to minimize misfires.

2. A combination according to claim 1 in which said firing pin means includes a plurality of firing pins to further minimize the possibility of misfire.

3. A combination according to claim 1 in which said initiator includes about 2.8 grams of a material having the following approximate composition in percent by weight: nitrocellulose 75.50, nitroglycerin 20.00, barium nitrate 1.50, potassium nitrate 1.00, graphite 0.75, diphenylamine 0.25 and dinitrotoluene 1.00.

References Cited by the Examiner

UNITED STATES PATENTS

| | | | |
|---|---|---|---|
| 2,954,947 | 10/1960 | Zabelka et al. | 244—122 |
| 3,034,289 | 5/1962 | Stott et al. | 60—26.1 |
| 3,035,796 | 5/1962 | Glass | 244—122 |
| 3,063,240 | 11/1962 | Ledwith | 60—39.47 X |
| 3,125,851 | 3/1964 | Rubinstein et al. | 60—39.47 X |
| 3,169,003 | 2/1965 | Glass | 244—122 |

MARK NEWMAN, *Primary Examiner.*
CARLTON R. CROYLE, *Examiner.*